US012591739B2

(12) United States Patent
Mubarak et al.

(10) Patent No.: US 12,591,739 B2
(45) Date of Patent: Mar. 31, 2026

(54) METHOD AND SYSTEM FOR DIACRITIZING ARABIC TEXT

(71) Applicant: Qatar Foundation for Education, Science and Community Development, Doha (QA)

(72) Inventors: Hamdy S. Mubarak, Doha (QA); Kareem Mohamed Darwish, Doha (QA); Ahmed Abdelali, Doha (QA); Hassan Sajjad, Doha (QA); Younes Samih, Doha (QA)

(73) Assignee: HAMAD BIN KHALIFA UNIVERSITY, Doha (QA)

( * ) Notice: Subject to any disclaimer, the term of this patent is extended or adjusted under 35 U.S.C. 154(b) by 851 days.

(21) Appl. No.: 17/598,633

(22) PCT Filed: Mar. 27, 2019

(86) PCT No.: PCT/QA2019/050007
§ 371 (c)(1),
(2) Date: Sep. 27, 2021

(87) PCT Pub. No.: WO2020/197421
PCT Pub. Date: Oct. 1, 2020

(65) Prior Publication Data
US 2022/0188515 A1     Jun. 16, 2022

(51) Int. Cl.
*G06F 40/10*          (2020.01)
*G06F 40/166*         (2020.01)
(Continued)

(52) U.S. Cl.
CPC .......... *G06F 40/279* (2020.01); *G06F 40/166* (2020.01); *G06F 40/274* (2020.01); *G06N 20/00* (2019.01)

(58) Field of Classification Search
CPC ...... G06F 40/232; G06F 3/018; G06F 40/253; G06F 40/129; G06F 40/284; G06F 40/166; G06F 3/0237; G06F 16/334
See application file for complete search history.

(56) References Cited

U.S. PATENT DOCUMENTS 7,802,184 B1     9/2010  Battilana
9,298,277 B1 *   3/2016  Alsabah .................. G06F 3/018
(Continued)

FOREIGN PATENT DOCUMENTS

WO     WO-2009042861 A1 *   4/2009   ......... G06F 17/2223
WO     WO-2014138756 A1 *   9/2014   .......... G06F 17/273
WO     WO-2014189400 A1 *  11/2014   ......... G06F 17/2217

OTHER PUBLICATIONS

Rashwan et al, "Deep learning framework with confused sub-set resolution architecture for automatic Arabic diacritization", 2015, IEEE/ACM Transactions on Audio, Speech, And Language Processing. Feb. 26, 2015;23(3):505-16. (Year: 2015).*
(Continued)

*Primary Examiner* — Olujimi A Adesanya
(74) *Attorney, Agent, or Firm* — K&L Gates LLP

(57) ABSTRACT

The presently disclosed method and system automatically diacritize written Arabic text for use with applications that require verbalizing Arabic text. A method may comprise converting a written sentence into a word sequence and identifying a target source word. The method then may comprise repeatedly overlaying and translating a context window at a plurality of positions in the word sequence to select a plurality of subsets of the word sequence contained within the context window. A diacritized form of the target source word may be generated in each of the word sequence subsets. A final diacritized form of the target source word may be selected from the plurality of diacritized forms based on a voting scheme. The voting scheme may include select-
(Continued)

402 — Receive source sentence

404 — Convert source sentence into a word sequence and identify target source word 406 — Overlay a context window at a first position within the word sequence to select a first subset of the word sequence including the target source word 408 — Generate a first diacritized form of the target source word 410 — Translate the context window to a second position within the word sequence to select a second subset including the target source word 412 — Generate a second diacritized form of the target source word 414 — Repeat steps 410-412 to generate a plurality of diacritized forms of the target source word until the target source word has been in every context window position 416 — Implement voting scheme ing the diacritized form that is generated the most or may be based on a system of weighting factors.

16 Claims, 6 Drawing Sheets

(51) Int. Cl.

| | |
|---|---|
| *G06F 40/274* | (2020.01) |
| *G06F 40/279* | (2020.01) |
| *G06N 20/00* | (2019.01) |

(56)        References Cited

U.S. PATENT DOCUMENTS

| | | | | |
|---|---|---|---|---|
| 9,501,708 | B1* | 11/2016 | Ahmad ................ | G06V 30/245 |
| 9,792,271 | B2 | 10/2017 | Keenan | |
| 2005/0192807 | A1* | 9/2005 | Emam .................. | G06F 40/232 |
| | | | | 704/260 |
| 2007/0225977 | A1* | 9/2007 | Emam .................. | G06F 40/232 |
| | | | | 704/235 |
| 2010/0082333 | A1* | 4/2010 | Al-Shammari ..... | G06F 16/3335 |
| | | | | 704/10 |
| 2012/0109633 | A1* | 5/2012 | Khorsheed ............ | G06F 40/232 |
| | | | | 704/8 |
| 2013/0185054 | A1* | 7/2013 | Xiao .................... | G06F 40/109 |
| | | | | 704/9 |
| 2014/0258852 | A1* | 9/2014 | Sesum .................. | G06F 40/263 |
| | | | | 715/256 |
| 2014/0380169 | A1* | 12/2014 | Eldawy .................. | G06F 3/167 |
| | | | | 715/728 |
| 2017/0017854 | A1* | 1/2017 | You ...................... | G06V 30/414 |

OTHER PUBLICATIONS

Preliminary Report on Patentability for related International Application No. PCT/QA2020/050007; report dated Oct. 7, 2021; (6 pages).

International Search Report for related International Application No. PCT/QA2019/050007; report dated Oct. 1, 2020; (2 pages).

Written Opinion for related International Application No. PCT/QA2019/050007; report dated Oct. 1, 2020; (4 pages).

Abandah, et al. "Automatic diacritization of Arabic text using recurrent neural networks"; International Journal on Document Analysis and Recognition (IJDAR), 2015 [online], [retrieved on Jul. 17, 2020]. Retrieved from the Internet <URL: https://www.researchgate.net/profile/Fuad_Jamour/publication/273918305_Automatic_diacritization_of_Arabic_text_using_recurrent_neural_networks/links/59edf2ac0f7e9bc36525248c/Automatic-diacritization-of-Arabic-text-using-recurrent-neural-networks.pdf>. (16 Pages).

Espana-Bonet, et al.; "Discriminative phrase-based models for Arabic machine translation"; ACM Transactions on Asian Language Information Processing, Dec. 2009 [online], [retrieved on Jul. 17, 2020]. Retrieved from the Internet <URL: https://www.researchgate.net/profile/Jesus_Gimenez/publication/220316683_Discriminative_Ph rase-Based_Models_for_Arabic_Machine_Translation/links/54 7 ed7650cf2de80e 7 cc6aaa.pdf>; (22 Pages).

* cited by examiner

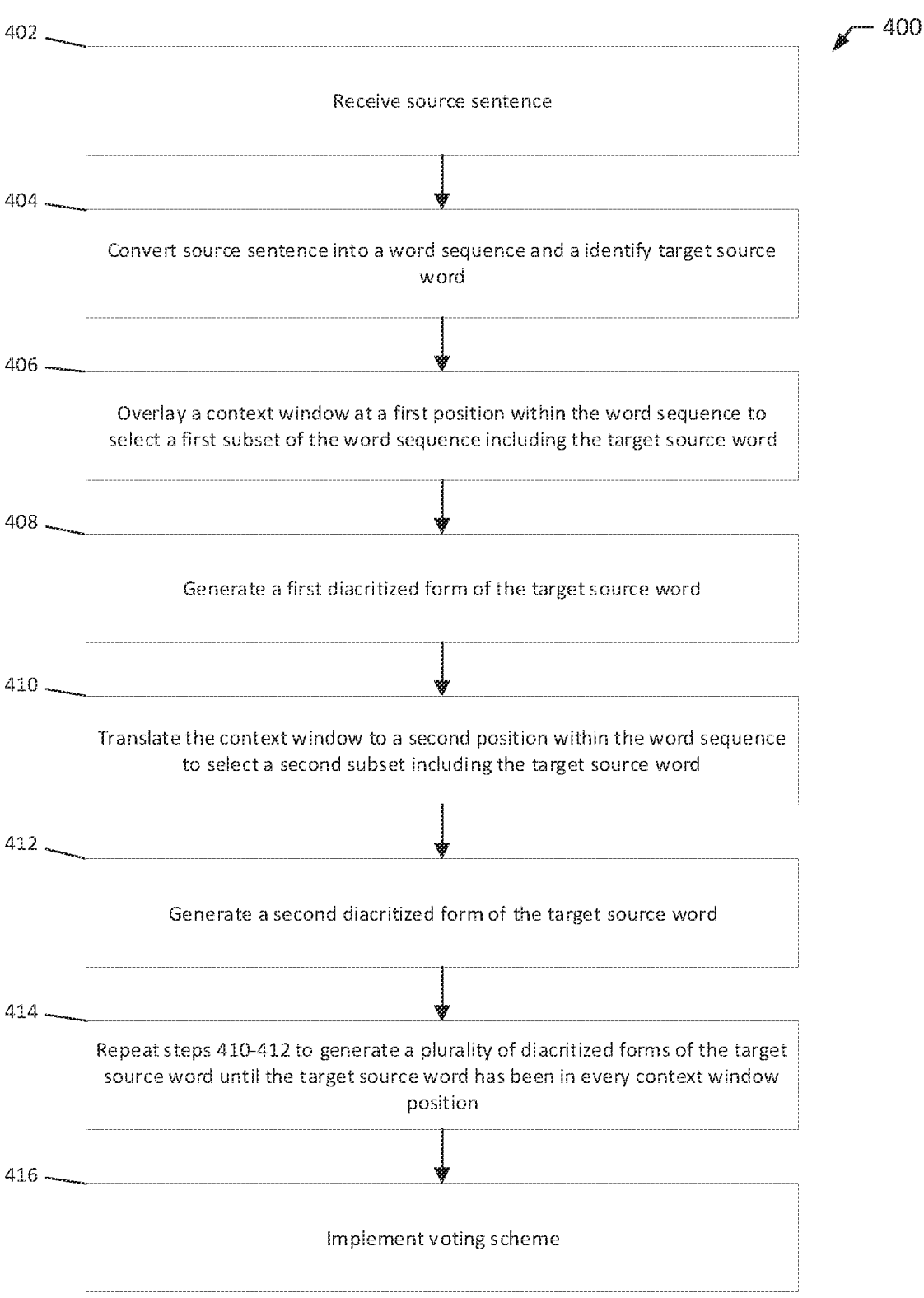

402 — Receive source sentence

404 — Convert source sentence into a word sequence and a identify target source word 406 — Overlay a context window at a first position within the word sequence to select a first subset of the word sequence including the target source word 408 — Generate a first diacritized form of the target source word 410 — Translate the context window to a second position within the word sequence to select a second subset including the target source word 412 — Generate a second diacritized form of the target source word 414 — Repeat steps 410-412 to generate a plurality of diacritized forms of the target source word until the target source word has been in every context window position 416 — Implement voting scheme

METHOD AND SYSTEM FOR DIACRITIZING ARABIC TEXT

BACKGROUND

The Arabic language uses two types of vowels, namely long vowels, which are explicitly placed in text, and short vowels, which are typically omitted from text. Short vowels are typically omitted because one feature of the Arabic writing system is that short vowels are not represented by an alphabet letter. Rather, short strokes called diacritics are placed either above or below the preceding consonant in order to represent a short vowel. Modern Arabic written text, however, is almost never diacritized. Readers of Arabic text will typically infer a word's meaning from the context of the surrounding text and knowledge of Arabic grammar and lexicon.

The presence of the diacritics, however, is required for properly verbalizing Arabic. Thus, for applications such as text to speech programs, the inclusion of the diacritics in the text is essential for the application to function properly. The method of adding the diacritics to non-diacritized text is called diacritization and is necessary for such applications.

There are two types of Arabic diacritics. Namely, there are core-word diacritics, which specify lexical selection, and case endings, which typically indicate syntactic role. Accordingly, one Arabic word can have many possible core-word diacritics depending on the intended meaning of the word, such as past, present, or future tense verb forms. In addition, most Arabic words can accept different case-endings depending on the context in which the word is used.

BRIEF SUMMARY OF THE INVENTION

The presently described method and system is an improved method and system for diacritizing Arabic text that represents a sentence as a sequence of words, translates a context window to create subsets of the sequence of words, generates a diacritized form of a target source word in each subset using a sequence to sequence model, and selects the most generated diacritized form. The system and method produces a word error rate that is significantly better than other diacritization systems.

In light of the disclosures herein, and without limiting the scope of the invention in any way, in a first aspect of the present disclosure, which may be combined with any other aspect listed herein unless specified otherwise, a method is provided comprising receiving a source sentence and converting that source sentence into a word sequence, wherein the word sequence includes a plurality of words including a target source word. The method may further comprise overlaying a context window at a first position in the word sequence to select a first subset of the word sequence contained within the context window. The target source word is within the first subset and a first diacritized form of the target source word is generated based on the first subset of the word sequence. The method may then comprise translating the context window to a second position within the word sequence to select a second subset of the word sequence contained within the context window. The target source word is within the second subset and a second diacritized form of the target source word is generated based on the second subset of the word sequence. The context window may then be repeatedly translated to generate a plurality of diacritized forms of the target source word. A final diacritized form may then be selected from the plurality of diacritized forms based on a voting scheme.

In a second aspect of the present disclosure, which may be combined with any other aspect listed herein unless specified otherwise, the plurality of words of the word sequence may comprise a sequence of characters.

In a third aspect of the present disclosure, which may be combined with any other aspect listed herein unless specified otherwise, the sequence of characters may comprise a character boundary in between each character within each of the plurality of words and a word boundary between each of the plurality of words in the word sequence.

In a fourth aspect of the present disclosure, which may be combined with any other aspect listed herein unless specified otherwise, the voting scheme may comprise recording the number of generations for each diacritized form and selecting the diacritized form of the target source word generated the most number of times.

In a fifth aspect of the present disclosure, which may be combined with any other aspect listed herein unless specified otherwise, the voting scheme may further include, responsive to identifying more than one diacritized from of the target source word generated the most number of times, selecting the diacritized form of the target source word from the segment of words in which the target source word is the center word of the segment of words.

In a sixth aspect of the present disclosure, which may be combined with any other aspect listed herein unless specified otherwise, the context window may be a fixed number of words in length.

In a seventh aspect of the present disclosure, which may be combined with any other aspect listed herein unless specified otherwise, the context window may be a fixed number of characters in length.

In an eighth aspect of the present disclosure, which may be combined with any other aspect listed herein unless specified otherwise, the context window may be a varying number of words in length.

In a ninth aspect of the present disclosure, which may be combined with any other aspect listed herein unless specified otherwise, the voting scheme may include selecting the diacritized form of the target source word based on weighting factors assigned to each respective context window of a given length.

In a tenth aspect of the present disclosure, which may be combined with any other aspect listed herein unless specified otherwise, the method may include generating a diacritized form of a target source word by inputting the word sequence into at least one machine learning model.

In an eleventh aspect of the present disclosure, which may be combined with any other aspect listed herein unless specified otherwise, the method may include generating the plurality of diacritized forms by the same machine learning model.

In a twelfth aspect of the present disclosure, which may be combined with any other aspect listed herein unless specified otherwise, the method may include generating the plurality of diacritized forms by more than one machine learning model.

In a thirteenth aspect of the present disclosure, which may be combined with any other aspect listed herein unless specified otherwise, the machine learning model may be a sequence to sequence model.

In a fourteenth aspect of the present disclosure, which may be combined with any other aspect listed herein unless specified otherwise, translating the context window may comprise incrementing the position of the context window by a set number of words.

In a fifteenth aspect of the present disclosure, which may be combined with any other aspect listed herein unless specified otherwise, the context window may be incremented by one word.

In a sixteenth aspect of the present disclosure, which may be combined with any other aspect listed herein unless specified otherwise, a system comprises a processor and a memory storing instructions which, when executed by the processor, may cause the processor to receive a source sentence and convert it into a word sequence. The word sequence may include a plurality of words including a target source word. The memory may store further instructions which, when executed by the processor, cause the processor to overlay a context window at a first position in the word sequence to select a first subset of the word sequence contained within the context window. The target source word may be within the first subset and the processor may generate a first diacritized form of the target source word based on the first subset of the word sequence. The memory may store further instructions which, when executed by the processor, cause the processor to translate the context window to a second position within the word sequence to select a second subset of the word sequence contained within the context window. The target source word may be within the second subset and the processor may generate a second diacritized form of the target source word based on the second subset of the word sequence. The memory may store further instructions which, when executed by the processor, cause the processor to repeatedly translate the context window to generate a plurality of diacritized forms of the target source word. The memory may store further instructions which, when executed by the processor, cause the processor to select a final diacritized form from the plurality of diacritized forms based on a voting scheme.

In a seventeenth aspect of the present disclosure, which may be combined with any other aspect listed herein unless specified otherwise, the processor may convert the source sentence into a word sequence that includes a sequence of characters.

In an eighteenth aspect of the present disclosure, which may be combined with any other aspect listed herein unless specified otherwise, the processor may select a final diacritized form based on a voting scheme that includes recording the number of generations for each diacritized form and selecting the diacritized form of the target source word generated the most number of times.

In a nineteenth aspect of the present disclosure, which may be combined with any other aspect listed herein unless specified otherwise, the context window may be a varying number of words in length and the processor may select a final diacritized form based on a voting scheme that includes selecting the diacritized form of the target source word based on weighting factors assigned to each respective context window of a given length.

In a twentieth aspect of the present disclosure, which may be combined with any other aspect listed herein unless specified otherwise, a non-transitory, computer-readable medium storing instructions which, when performed by a processor, may cause a processor to receive a source sentence and convert it into a word sequence. The word sequence may include a plurality of words including a target source word. The computer-readable medium may store further instructions which, when performed by the processor, cause the processor to overlay a context window at a first position in the word sequence to select a first subset of the word sequence contained within the context window. The target source word may be within the first subset and the processor may generate a first diacritized form of the target source word based on the first subset of the word sequence. The computer-readable medium may store further instructions which, when performed by the processor, cause the processor to translate the context window to a second position within the word sequence to select a second subset of the word sequence contained within the context window. The target source word is within the second subset and the processor generates a second diacritized form of the target source word based on the second subset of the word sequence. The computer-readable medium may store further instructions which, when performed by the processor, cause the processor to repeatedly translate the context window to generate a plurality of diacritized forms of the target source word. The computer-readable medium may store further instructions which, when performed by the processor, cause the processor to select a final diacritized form from the plurality of diacritized forms based on a voting scheme.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE FIGURES

FIG. 4 illustrates an example embodiment of a method of the present disclosure.

DETAILED DESCRIPTION

The Arabic language includes two types of vowels, long vowels and short vowels. Short vowels are not represented by an alphabet letter in text, but rather are indicated by marks called diacritics. The presence of diacritics can change a word's meaning. Nonetheless, modern Arabic written texts rarely include diacritics, leaving readers to infer a word's meaning from the context of the surrounding text and knowledge of Arabic grammar and lexicon. Properly verbalizing Arabic, however, requires the diacritics to be present. Thus, the presently disclosed methods and systems automatically diacritize written Arabic text for use with applications that require verbalizing Arabic text, such as text to speech programs.

Example System

Figure 1:
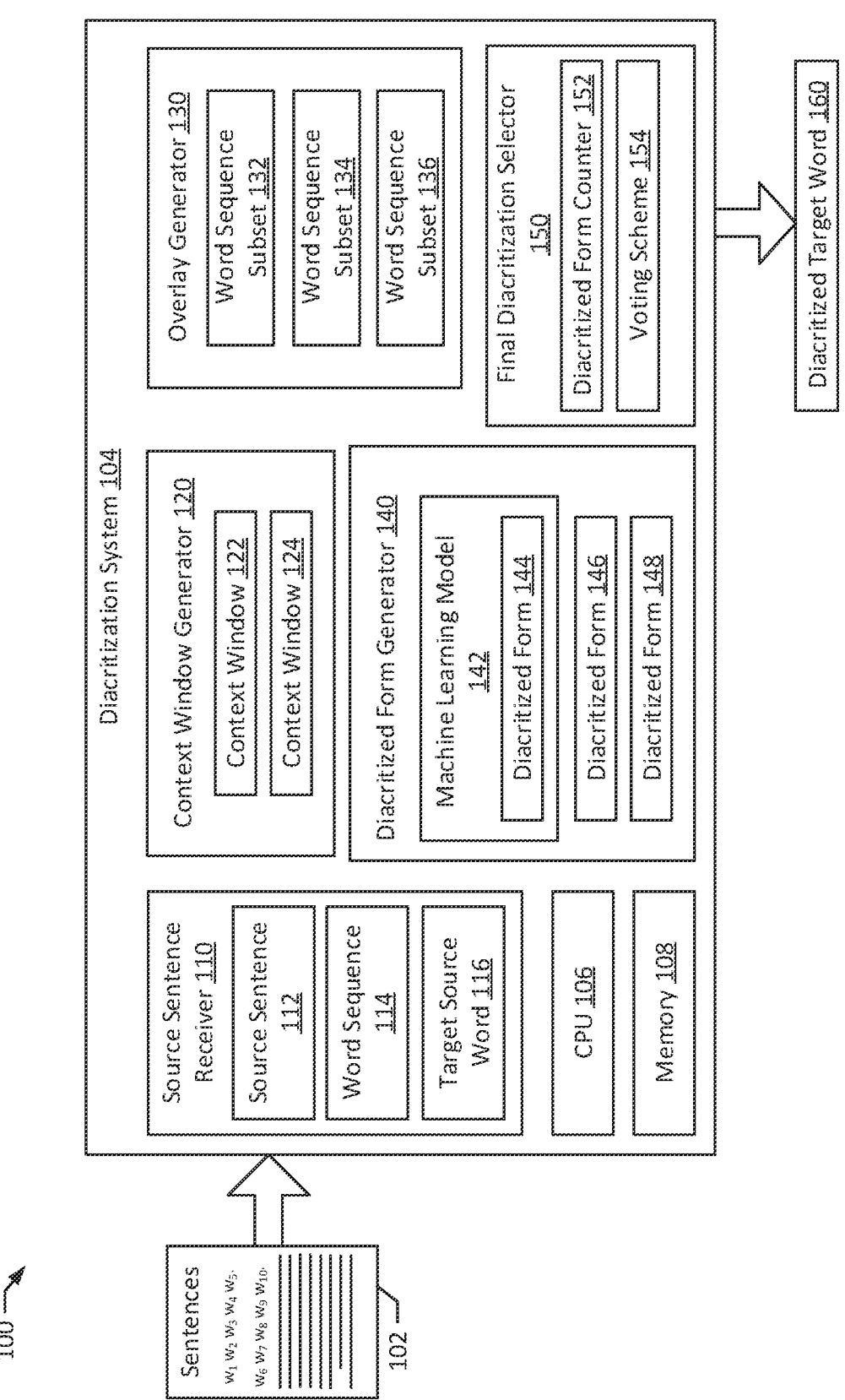
FIG. 1 illustrates an example embodiment of a system of the present disclosure.

FIG. 1 shows an example embodiment of system 100 for diacritizing a target source word in written Arabic text, according to an example embodiment of the present disclosure. An Arabic text document 102 is illustrated comprising a plurality of sentences. For example, $w_1, \ldots w_5$ comprises a first sentence and $w_6, \ldots w_{10}$ comprises a second sentence. The sentences are input into a diacritization system 104 which includes a source sentence receiver 110 that analyzes a single source sentence 112. The sentence receiver 110 converts the source sentence 112 into a word sequence 114 and identifies a single target source word 116 for diacritization.

The diacritization system 104 also includes a context window generator 120 which generates one or more context windows, for example, a context window 122 and a context window 124. An overlay generator 130 of the diacritization system 104 utilizes at least one context window, for example a context window 122, to create a plurality of subsets of the word sequence 114. For example, the overlay generator 130 may generate word sequence subsets 132, 134, 136 as illustrated.

The diacritization system 104 further includes a diacritized form generator 140 which includes a machine learning model 142, for example, a sequence to sequence model. The diacritized form generator 140 utilizes the machine learning model 142 to generate one diacritized form of the target source word 116 for each of the word sequence subsets. The diacritized form generator 140 then stores each generated diacritized form. For example, in the illustrated embodiment, the generator 140 may generate diacritized form 144 and store diacritized forms 146 and 148, which correspond to word sequence subsets 132, 134, and 136 respectively.

The diacritization system 104 also includes a final diacritization selector 150, which includes a diacritized form counter 152 that records the number of times the diacritized form generator 140 generates an identical diacritized form of the target source word 116. The final diacritization selector 150 additionally applies a voting scheme 154 to select a diacritized target word 160 from the diacritized forms 144, 146, 148.

It should be appreciated that while the diacritization of a single target source word from a single sentence is illustrated and described throughout this disclosure, the presently disclosed method employed by the system 100 may be repeated for every word in a sentence and for every sentence in a full text in order to diacritize a complete written Arabic text. It should further be appreciated that the system 100 may diacritize one word at a time, one sentence at a time, or may diacritize all sentences or words simultaneously, or any other additional combination of timing thereof. In particular, the machine learning model 142 may be configured to simultaneously generate diacritized forms 144, 146, 148 for each word in a word sequence subset 132, 134, 136. Further detail regarding the components of the system 100 and their respective functions is described below.

Word and Character Sequences

The diacritization of Arabic text is particular to the characters that comprise a word. Accordingly, in one embodiment of system 100, a source sentence 112 is converted into a word sequence 114, which may be represented as a sequence of characters. A word sequence 114 may separate a source sentence 112 into multiple words, single whole words, sub-word character sequences of varying lengths, or single characters. For example, each word of the word sequence 114 may be represented as one or more characters. Each character within a word may be separated by a character boundary and each word may be separated by a word boundary. For example, in one embodiment the character boundary may be a space character (e.g., " ") and the word boundary may be a "_" character. This character-level representation may reduce the required vocabulary size and may help avoid out of vocabulary words.

Figures 2A, 2B:
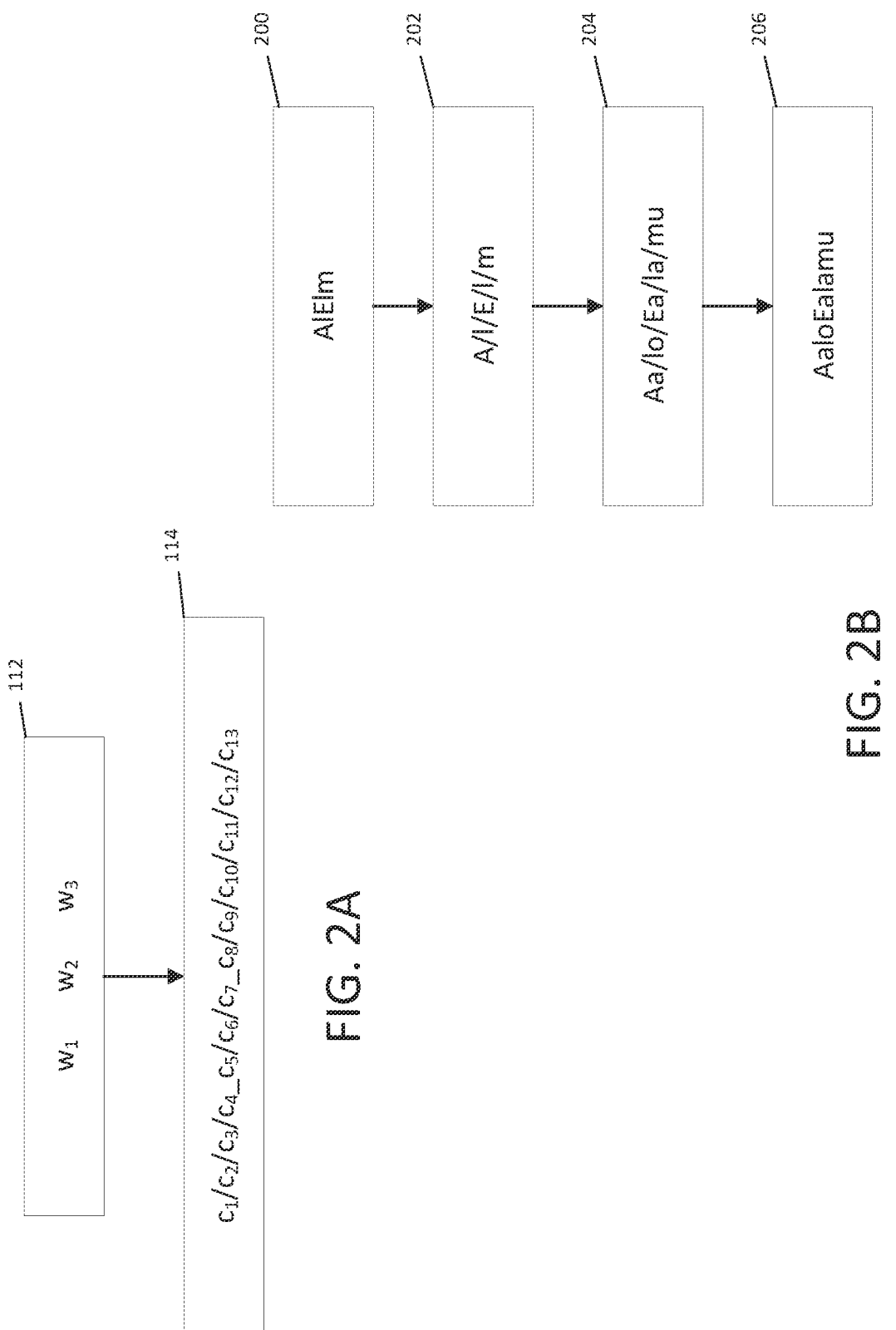
FIGS. 2A and 2B illustrate example source and diacritized words represented as character sequences.

Referring now to FIG. 2A, an example source sentence 112 is illustrated as including words $w_1$, $w_2$, and $w_3$. The example source sentence 112 is then converted into a word sequence 114 which is represented as a sequence of characters $c_1, \ldots c_{13}$. In the illustrated embodiment, the sequence of characters includes a space in between each character $c_n$, denoted by the "/" character, and a word boundary in between each word denoted by the "_" character. It should be appreciated, however, that any character may be used to delineate between individual characters and separate words. For example, in alternative implementations, one or more of the "-" character, the "\" character, and the "*" character may be used to delineate in between individual characters or words of the word sequence 114.

In one embodiment, the system 100 processes a word sequence 114 represented as a sequence of characters, including a target source word 116, and generates a diacritized form 144, 146, 148 of the target source word 116, which is also represented as a sequence of characters. Each set of characters between either a character boundary or word boundary is considered a token. In the case of a target source word 116, each single character may be considered a token (e.g., by the machine learning model 142) because there is a character boundary or word boundary in between every character. The diacritized form 144, 146, 148, however, may be split into a sequence of subword units each consisting of a letter and its diacritic(s). Thus, each of these subword units may be considered a token. In various embodiments, because a target source word 116 and its diacritized form 144, 146, 148 are necessarily tied to one another, the target source word 116 and its diacritized form 144, 146, 148 have an identical number of tokens. Splitting a diacritized form 144, 146, 148 into a sequence of subword units enables an identical number of tokens between a target source word 116 and a diacritized form 144, 146, 148. This helps reduce the number of potential outputs of each word sequence 114 for the machine learning model 142, which can help improve the accuracy of the generated diacritized form 144, 146, 148.

FIG. 2B illustrates the above-described embodiment. An example target source word 200 is converted into an example character representation 202. It should be understood that showing the character representation 202 independently is for illustrative purposes and generally the representation 202 would be part of a word sequence (e.g., the word sequence 114 in FIG. 2A). An example diacritized form 204 is generated from character representation 202 (e.g., by the machine learning model 142). The example diacritized form 204 is a character representation of the diacritized target word 206. In certain implementations, the machine learning model 142 may be configured to generate a diacritized form 144, 146, 148 of a target source word 116 such that the diacritized form 144, 146, 148 has the same number of tokens as the target source word 116. For example, the character representation 202 has five tokens and the diacritized form 204 also has five tokens. The tokens in the character representation 202 are each individual letter character, namely "A" "l" "E" "l" and "m". The tokens in the diacritized form 204 are each letter and its diacritic, namely "Aa" "lo" "Ea" "la" and "mu". It should be appreciated that the illustration in FIG. 2B may be expanded to word sequences of any length.

Translating Context Window

As discussed above, character-level representation of a source sentence 112 has its benefits; however, machine learning models based on character-level representation suffer from not learning contextual effects from the surrounding words. The presently disclosed method and system addresses this contextual deficiency by overlaying and translating at least one context window 122, 124 over a word sequence 114 to create word sequence subsets 132, 134, 136 and by employing a voting scheme 154 to select the most likely diacritized form, diacritized target word 160, generated from each word sequence subset 132, 134, 136.

As discussed above, the context window generator 120 generates at least one context window, for example, context window 122 in FIG. 1. In one embodiment, the context window 122 is a certain number of words in length. In another embodiment, the context window 122 is a certain number of characters in length. In other embodiments, the context window 122 varies in length as the presently disclosed method is performed. In embodiments in which the context window 122 varies in length, the context window generator 120 may generate a single context window 122 and vary its length or may generate more than one context window, such as context windows 122 and 124, which have different lengths. For example, in at least one embodiment the context window 122 may create three-word word sequence subsets 132, 134, 136 and the context window 124 may create five-word word sequence subsets 132, 134, 136. It should be appreciated that a context window 122, 124 may have a number of positions equal to the number of words or characters that define the context window's length. Thus, if context window 122 creates three-word subsets, the underlying words have three positions: a center position and one position to each side of the center position.

The overlay generator 130 then utilizes at least one context window 122, 124 to generate word sequence subsets 132, 134, 136 from within the word sequence 114. In one embodiment, the overlay generator 130 creates a first word sequence subset 132 by overlaying the context window 122, 124 on the word sequence 114 with the target source word 116 all the way to one side of the context window 122, 124, for example, the right side of the context window 122, 124. It should be appreciated, however, that the first word sequence subset 132 may be created with the target source word 116 in any position in the context window 122, 124.

To create the second word sequence subset 134, the overlay generator 130 may translate the context window 122, 124 by incrementing the context window's 122, 124 position a set number of words. In one embodiment, the context window 122, 124 may be translated one word within the word sequence 114. In other embodiments, the context window 122, 124 may be translated more than one word within the word sequence 114. In other embodiments still, the context window 122, 124 may be translated by incrementing the context window's position a set number of characters rather than words. The overlay generator 130 may continue translating the context window 122, 124 and generating word sequence subsets 132, 134, 136 until a word sequence subset 132, 134, 136 has been generated in which the target source word 116 has been in every position in the context window 122, 124. Depending on the implementation, the overlay generator 130 may translate the context window 122, 124 from left to right, or from right to left across the word sequence 114.

Figure 3:
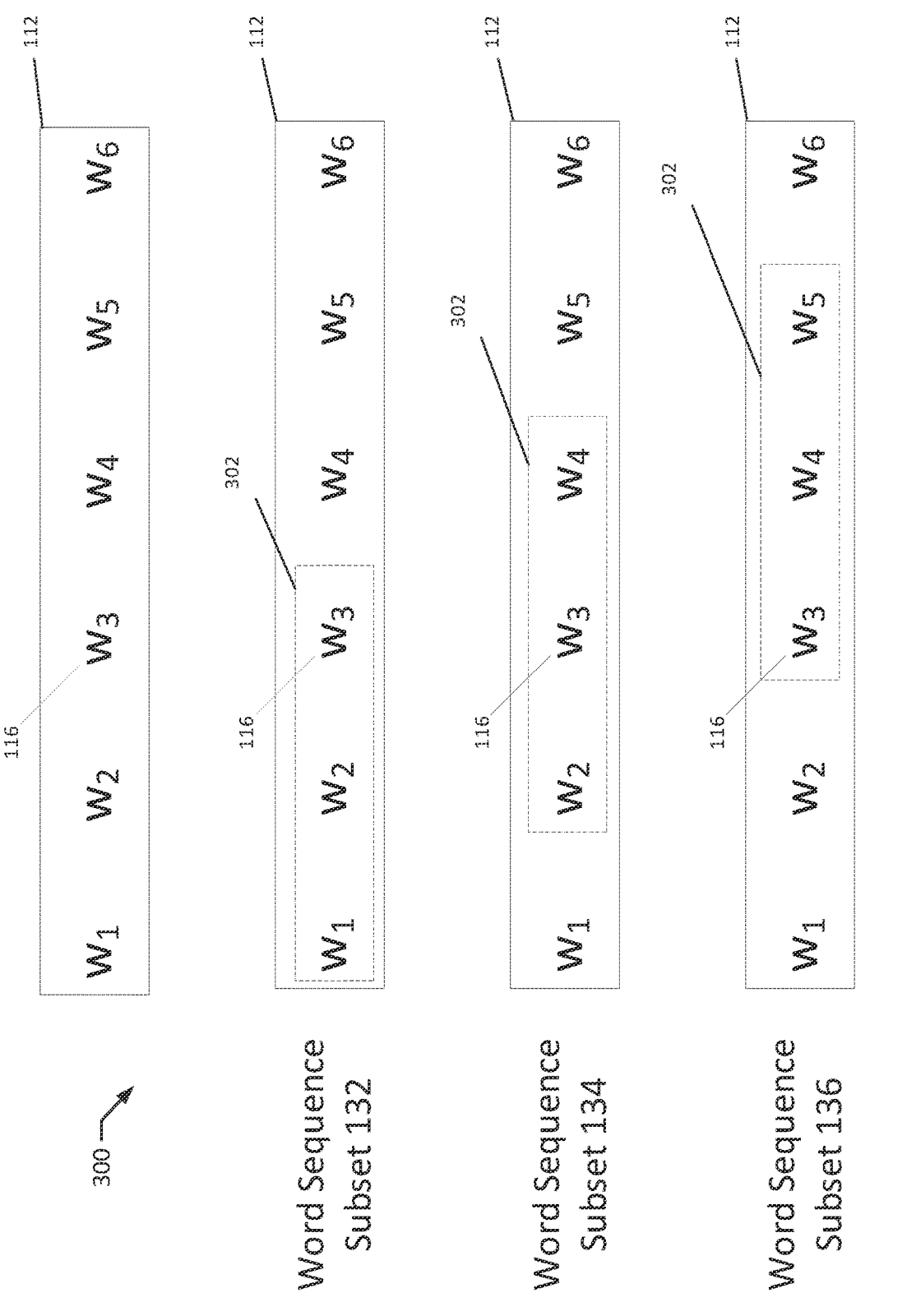
FIG. 3 illustrates an example embodiment of a context window translation process of the present disclosure.

FIG. 3 illustrates an example embodiment of a translation process 300 (in conjunction with FIG. 1) of a context window 302 with a word sequence 114 that is shown consisting of words $w_1, \ldots w_6$. The example translation process 300 is illustrated with $w_3$ as the target source word 116, and with a context window 302 that is three words in length and translates by increments of one word from left to right. In the illustrated embodiment, overlay generator 130 generates a word sequence subset 132 with the context window 302 overlaying words $w_1$, $w_2$, and $w_3$. Notably, the target source word 116 is in the third position of the context window 302. The overlay generator 130 then generates the word sequence subset 134 by translating the context window 302 one word along the word sequence 114 to overlay $w_2$, $w_3$, and $w_4$. Notably, the target source word 116 is in the second position of the context window 302. The overlay generator 130 then generates the word sequence subset 136 by translating the context window 302 one word along the word sequence 114 to overlay $w_3$, $w_4$, and $w_5$. Notably, the target source word 116 is in the first position of the context window 302.

In this example, the overlay generator 130 is now finished generating word sequence subsets 132, 134, 136 for the source sentence 112 because word sequence subsets 132, 134, 136 have been generated with the target source word 116 in every position of the context window 302. Namely, the context window 302 has three positions because it is three words long and the overlay generator 130 generated three subsets: one with the target source word 116 in the first position, one with the target source word 116 in the second position, and one with the target source word 116 in the third position. It should also be appreciated that word sequence subsets 132, 134, and 136 could have been generated in any order.

Predicting Diacritized Form

Once the overlay generator 130 generates a word sequence subset 132, 134, 136, the diacritized form generator 140 utilizes machine learning model 142 to generate a diacritized form 144, 146, 148 of the target source word 116 in the subset. In one embodiment, machine learning model 142 is a sequence to sequence model. For example, machine learning model 142 may be a noisy channel model, a conditional random fields model, a convolutional and/or recurrent neural network-based model, an attention-based neural network model, or any other type of sequence to sequence model. In other embodiments, the system 100 employs types of machine learning models other than a sequence to sequence model to generate diacritized forms 144, 146, 148 of target source word 116. In other embodiments still, the system 100 employs more than one type of machine learning model 142.

The diacritized form generator 140 generates a diacritized form 144, 146, 148 for each of the word sequence subsets 132, 134, 136 that the overlay generator 130 generates. Returning to the example above in reference to FIG. 3, the diacritized form generator 140 generates a diacritized form 144 for target source word 116 in word sequence subset 132, a diacritized form 146 for target source word 116 in word sequence subset 134, and a diacritized form 148 for target source word 116 in word sequence subset 136.

It should be appreciated that the diacritized form generator 140 may generate the diacritized form 144, 146, 148 of a target source word 116 as soon as overlay generator 130 generates a word sequence subset, or the diacritized form generator 140 may generate the diacritized forms 144, 146, 148 of a target source word 116 after the overlay generator 130 generates all of the word sequence subsets.

FIG. 4 illustrates an example embodiment of a method 400 of the presently disclosed method, as was discussed above in relation to the system 100. The method 400 may be implemented on a computer system, such as the system 100.

For example, the method 400 may be implemented by the source sentence receiver 110, the context window generator 120, the overlay generator 130, the diacritized form generator 140, and/or the final diacritization selector 150. The method 400 may also be implemented by a set of instructions stored on a computer readable medium that, when executed by a processor, cause the computer system to perform the method. For example, all or part of the method 400 may be implemented by the CPU 106 and the memory 108. Although the examples below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

Step 402 includes receiving a source sentence 112 from an Arabic written text 102. The source sentence 112 is then converted into a word sequence 114 as discussed above and a target source word 116 is identified in step 404. As discussed in more detail above, a context window 122, 124 is overlayed at a first position within the word sequence 114 to select a word sequence subset 132, 134, 136 in step 406. The target source word 116 may be contained within the word sequence subset 132, 134, 136. In step 408, a first diacritized form 144, 146, 148 of the target source word 116 is generated. For example, the machine learning model 142 may analyze the word sequence subset 132 and may generate a diacritized form 144 of the word sequence subset 132. In generating the diacritized form 144, the machine learning model 142 may incorporate contextual information provided by adjacent or nearby words. For example, in generating the diacritized form 144 for the target source word 116, the machine learning model 142 may compare the target source word 116 to other words in the word sequence subset 132.

Step 410 may include the overlay generator 130 translating the context window 122, 124 to a second position within the word sequence 114, as discussed in more detail above, to select a second word sequence subset, such as word sequence subset 134. The diacritized form generator 140 (e.g., the machine learning model 142) generates a second diacritized form 146 of the target source word 116 in step 412. The second diacritized form 144, 146, 148 may be generated similar to the first diacritized form 144, 146, 148 in step 408 above. Steps 410-412 may then be repeated to generate a plurality of diacritized forms 144, 146, 148 of the target source word 116. In other words, the context window 122, 124 is translated to a third position within the word sequence 114 to generate a third diacritized form 144, 146, 148 of the target source word 116, and then translated to a fourth position, and so forth.

As discussed in further detail above, steps 410-412 may be repeated until a diacritized form 144, 146, 148 of the target source word 116 has been generated with the target source word 116 in every context window 122, 124 position. Alternatively, steps 410-412 may be repeated until the number of diacritized forms 144, 146, 148 of the target source word 116 exceeds a certain, predetermined threshold. Once the target source word 116 has been in every context window 122, 124 position, a voting scheme 154 is implemented in step 416 to select the final diacritized form 144, 146, 148 of the target source word 116. Example voting schemes 154 will be discussed in greater detail below.

Selecting Final Diacritized Form

In one embodiment, after the diacritized form generator 140 generates a diacritized form 144, 146, 148 of the target source word 116 from each word sequence subset 132, 134, 136, the final diacritization selector 150 selects the most likely diacritized target word 160 by implementing a voting scheme 154. By implementing a voting scheme 154, the diacritization system 104 and/or the final diacritization selector 150 selects the most likely diacritized form of a target source word 116 with the least amount of error. To implement the voting scheme 154, the final diacritization selector 150 may include a diacritized form counter 152 that records the number of times the diacritized form generator 140 generates a specific diacritized form 144, 146, 148. For example, if the diacritized form generator 140 generated the diacritized form "Aa/lo/Ea/lo/mu" for word sequence subsets 132 and 134 in FIG. 3, and the diacritized form "Aa/lo/Ee/lo/mu" for word sequence subset 136 (a valid diacritized form, but incorrect given the context), the diacritized form counter 152 would record that "Aa/lo/Ea/la/mu" was generated two times and that "Aa/lo/Ee/lo/mu" was generated one time.

In various embodiments, the voting scheme 154 comprises selecting the diacritized form 144, 146, 148 that was generated the most number of times according to the diacritized form counter 152. In one embodiment, if there is more than one diacritized form 144, 146, 148 generated the most number of times, in other words there is a tie, then the example voting scheme 154 selects the diacritized form 144, 146, 148 generated when the target source word 116 was in the center position of the context window 122, 124. For example, in reference to FIG. 3, if a different diacritized form 144, 146, 148 was generated for each word sequence subset 132, 134, and 136, then there would be a tie of one generation for each. Accordingly, the final diacritization selector 150 would select the diacritized form 144, 146, 148 generated from the word sequence subset 134 (i.e., when target source word 116 was in the center of context window 302).

In various other embodiments, if there is a tie, the voting scheme 154 may include weighting factors for determining which diacritized form 144, 146, 148 prevails in a tie. For example, given a context window 122, 124 with five positions, if diacritized form 144 is generated when the target source word 116 is in the first two positions (i.e., two times), diacritized form 146 is generated in the center position (i.e., one time), and diacritized form 148 is generated in the last two positions (i.e., two times), there would be a tie between diacritized form 144 and 148. In an embodiment with weighting factors for ties, the method may apply more weight to, for example, diacritized form 148 which is thus selected as the diacritized target word 160, rather than selecting diacritized form 146 because it was generated when the target source word 116 was in the center position. It should appreciated that in various embodiments with context windows 122, 124 that do not have a center position (e.g., an even number of words or characters in length), a voting scheme 154 with weighting factors may be used.

Figure 5:
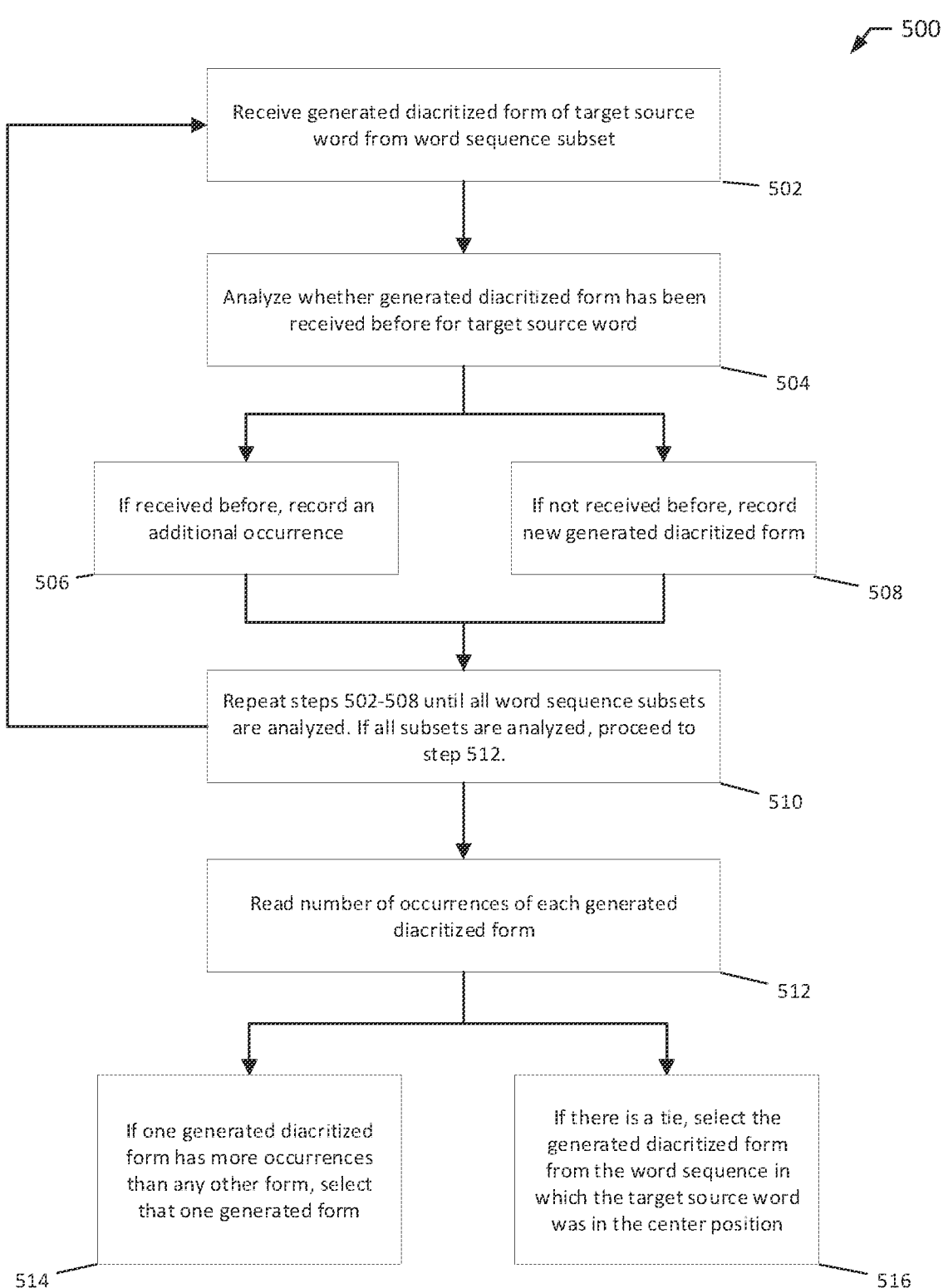
FIG. 5 illustrates an example embodiment of a method of the present disclosure.

FIG. 5 illustrates the above-described example of an embodiment of voting scheme 154 in more detail as method 500. The method 500 may be implemented on a computer system, such as the system 100. For example, the method 500 may be implemented by the source sentence receiver 110, the context window generator 120, the overlay generator 130, the diacritized form generator 140, and/or the final diacritization selector 150. The method 500 may also be implemented by a set of instructions stored on a computer readable medium that, when executed by a processor, cause the computer system to perform the method. For example, all or part of the method 500 may be implemented by the CPU 106 and the memory 108. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

Step 502 indicates the final diacritization selector 150 may receive a generated diacritized form 144, 146, 148 of a target source word 116 from a word sequence subset 132, 134, 136. In step 504, the final diacritization selector 150 may analyze whether the generated diacritized form 144, 146, 148 has been received before for the target source word 116. If the generated diacritized form 144, 146, 148 has been received before, then the diacritized form counter 152 in step 506 may record an additional generation for the diacritized form 144, 146, 148 (e.g., increments the diacritized form counter 152 associated with the generated diacritized form 144, 146, 148). If the generated diacritized form 144, 146, 148 has not been received before, then the counter 152 in step 508 may record the generated diacritized form 144, 146, 148 as a new diacritized form 144, 146, 148 in the diacritized form counter 152. In step 510, the final diacritization selector 150 may either repeat steps 502-508, or, if all word sequence subsets 132, 134, 136 have been analyzed, then the final diacritization selector 150 may proceed to step 512.

In step 512, the final diacritization selector 150 may read the number of recorded generations of each generated diacritized form 144, 146, 148. If one generated diacritized form 144, 146, 148 has more generations than any other form, then the final diacritization selector 150 may select that most-frequently generated diacritized form 144, 146, 148 in step 514. If there is a tie, as discussed above, then in one embodiment the final diacritization selector 150 may select in step 516 the diacritized form 144, 146, 148 generated from the word sequence subset 132, 134, 136 in which the target source word 116 was in the center of the context window 122, 124.

Figure 6:
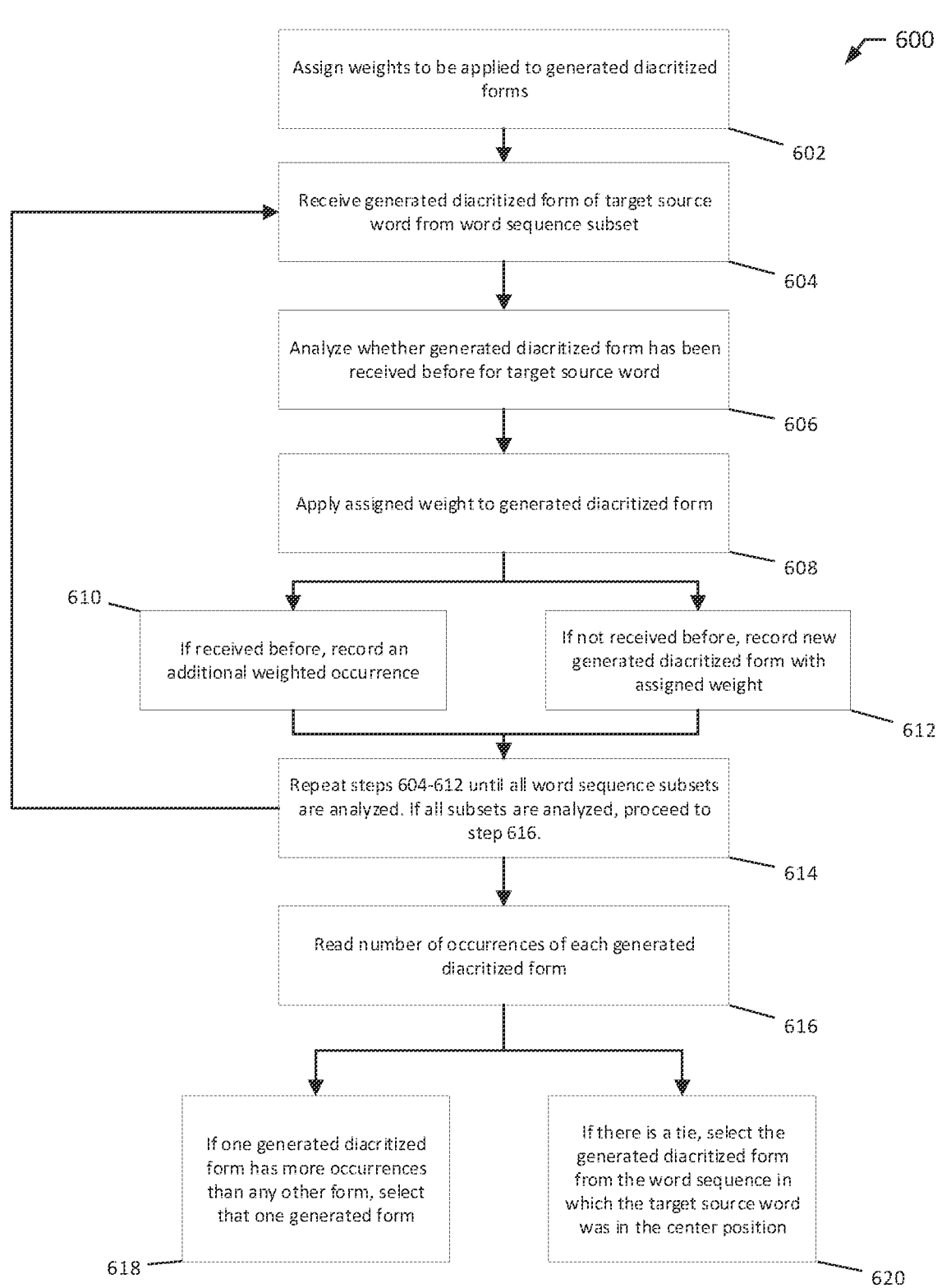
FIG. 6 illustrates an example embodiment of a method of the present disclosure.

In various other embodiments, as illustrated in an example embodiment of the method 600 in FIG. 6, voting scheme 154 comprises weighting factors, such as assigning a plurality of weights to generated diacritized forms 144, 146, 148 in order to select the most likely diacritized form 144, 146, 148 of a target source word 116 with the least amount of error. For example, in embodiments with more than one context window 122, 124, different weights may be assigned to the diacritized forms 144, 146, 148 generated by the different context windows 122, 124 in step 602. To further explain this example, one context window 122 may be seven words in length and assigned a weight factor of 1.0, whereas a second context window 124 may be three words in length and assigned a weight factor of 0.5.

Thus, in example step 608, when diacritized form counter 152 records the number of times the diacritized form generator 140 generates a specific diacritized form 144, 146, 148, it must take into account the weights assigned to the context window 122, 124 the diacritized form generator 140 used to generate that specific diacritized form 144, 146, 148. Accordingly, if the diacritized form generator 140 utilizes context window 122 to generate diacritized form 144 four times, the weight factor of 1.0 will be applied and a count of four will be recorded. Conversely, if generator 140 utilizes context window 124 to generate a diacritized form 146 four times, the 0.5 weight factor will be applied and only a count of two will be recorded. The final diacritization selector 150 then performs method steps 616-620 as discussed in detail above with regard to method steps 512-516. It should be appreciated that the assigned weights may be applied before or after the number of generations for a diacritized form is recorded.

In another example of a voting scheme 154 comprising assigning a plurality of weights, different weight factors may be assigned to different positions of a given context window 122, 124. To further explain this example, context window 122 may be seven words long. In this example, the diacritized form 144, 146, 148 generated when the target source word 116 is in the center position of the context window 122 may be assigned a weight factor of 1.0, when the target source word 116 is one position incremented from the center is assigned a weight factor of 0.8, two positions incremented is assigned a weight factor of 0.6, and three positions incremented is assigned a weight factor of 0.4. The assigned weights are applied in the same manner as the previous example. It should be appreciated that in other embodiments voting scheme 154 may comprise a combination of assigning weight factors to both a context window 122, 124 and the various positions within the context window 122, 124. It should also be appreciated that a voting scheme 154 comprising assigning weights is not limited to the illustrative embodiments described herein and may comprise any method of assigning more weight to certain context windows 122, 124 or diacritized forms 144, 146, 148 than others.

Experimental Validation

The validation process of the presently disclosed system and method used a modern diacritized corpus of 4.5 million tokens that covers a wide range of topics such as politics, religion, sport, health, and economics. For testing, a freely available WikiNews corpus (18,300 words) was used as a test set, which covers a variety of genres. Table 1 below reports the size of the training and test sets including the unique diacritized and undiacritized tokens and the percentage of out of vocabulary words (OOVs) in the test set that don't appear in the training set. Ten percent of the train data was randomly used for validation and the rest for training. Sequence lengths of 100, 500 and 7 tokens were used for word-, character-, and window-based systems respectively. The vocabulary was restricted to 100 k words types and 1,000 character units.

TABLE 1

| | Train | | Test | | |
|---|---|---|---|---|---|
| | Total | Unique | Total | Unique | OOV |
| Diacritized | 4.5 M | 333 k | 18.3 k | 7.9 k | 5.0% |
| Undiacritized | | 209 k | | 6.8 k | 3.3% |

The settings for the LSTM-based sequence to sequence model were: word embeddings and LSTM states=512; 2 layer unidirectional LSTM; and dropout rate=0.3. The settings for the Transformer were: 6 encoder and 6 decoder layers each of size 512; number of attention heads=8; feed forward dimension=2048; and dropout=0.1. OpenNMT was used for implementation with tensorflow for all experiments.

A variety of experiments were conducted to determine the most accurate system for generating diacritized forms. Namely, "word-level" experiments were conducted where the input was a sequence of words and the output was a sequence of diacritized words and "character-level" experiments were conducted where the input was represented as a sequence of characters and the output as a sequence of diacritized characters. The variety of experiments are summarized in Table 2 below.

TABLE 2

| Word-level | Description |
|---|---|
| Baseline Word | Uses full sentences and shows the deficiency of using neural machine translation (NMT) directly. |
| Word 7 g | Uses non-overlapping windows of 7 words to compare to our best character-level model, which also uses a window of length 7. |
| Word 7 g + overlap | Uses a sliding window of 7 words. |
| Character-Level | |
| Baseline Character | Uses full sentences. |
| Character 7 g | Uses non-overlapping sequences of 7 words. |
| Character 7 g + overlap | Uses a sliding window of 7 words without voting. |
| Char ng-overlap + voting | Uses a sliding window of n words with voting, where we varied n to equal 3, 5, 7, and 11. When n = 7, we experimented with a sequence to sequence model with attention, a Transformer model, and a combination of both. |

The results of the experiments are summarized in Table 3 below. As the results show, using an NMT model at word or character level produced unusable results. Both Baseline experiments suffered from excessive repetition of characters that were often meaningless (e.g. "AalofaA}iti AaloHaAdiy waAlt~awaAliy Aaloayoiy AloanohaAti AaloanohaAti"). When the context was limited to seven words, the results improved dramatically, but nonetheless, the output still suffered from a high ratio of OOVs. Using characters instead alleviated the OOV problem and the results improved dramatically, with context length equal to seven yielding the best results. Using voting lowered word error rate (WER) further, leading to a 4.77% WER. Using a Transformer model led to a nearly identical WER to the NMT model with attention. However, the model results are somewhat complimentary. Thus, voting on the predictions across both systems improved the results further with a 4.49% WER. The WER of the presently disclosed system is 63.3% lower than the state-of-the-art.

TABLE 3

| Exp | Description | Core-word WER % | Case-endings WER % | WER % | Diacritics Error Rate % | OOV % |
|---|---|---|---|---|---|---|
| 01 | Baseline Word | 44.29 | 54.95 | 54.31 | 41.62 | 13.03 |
| 02 | Word 7 g | 14.83 | 19.01 | 20.69 | 18.92 | 11.04 |
| 03 | Word 7 g + overlap | 14.50 | 16.57 | 18.05 | 18.14 | 10.97 |
| 04 | Baseline Char | 41.29 | 41.95 | 48.31 | 36.62 | 0.00 |
| 05 | Char 3 g + overlap + voting | 2.31 | 5.97 | 7.79 | 2.01 | 0.00 |
| 06 | Char 5 g + overlap + voting | 2.37 | 3.57 | 5.49 | 1.49 | 0.00 |
| 07 | Char 7 g | 2.78 | 6.11 | 8.32 | 2.19 | 0.00 |
| 08 | Char 7 g + overlap | 2.04 | 3.23 | 4.94 | 1.34 | 0.00 |
| *09 | Char 7 g + overlap + voting | 1.99 | 3.07 | 4.77 | 1.30 | 0.00 |
| 10 | Char 11 g + overlap + voting | 3.03 | 3.93 | 6.40 | 1.78 | 0.00 |
| †11 | Char 7 g + overlap + voting (Transformer) | 2.05 | 3.04 | 4.77 | 1.29 | 0.00 |
| 12 | Combination *09 + †11 | 1.89 | 2.89 | 4.49 | 1.21 | 0.00 |

To conduct error analysis, 100 word-core errors and 100 case-ending errors ascertained as the most common error types were randomly selected. For case-ending errors, the top 4 error types were: long-distance dependency, confusion between different syntactic functions, wrong selection of morphological analysis, and named entities. Long-distance dependency (e.g. coordination or verb subject/object) accounted for 24% of errors, which is an artifact of using limited context. Increasing context size may help in some cases, but may introduce additional errors as is illustrated in Table 3. Confusion between different syntactic functions (e.g. noun-noun vs. noun-adjective, or verb-subject vs. verb-object) accounted for 22% of errors. Wrong selection of morphological analysis (e.g. present tense vs. past tense) accounted for 20% of errors. Named entities accounted for 16% of errors.

For word-core errors, the top error type was incorrect selection for ambiguous words which accounted for 60% of errors, most of which were related to active vs. passive voice. Named entities accounted for 32% of errors, borrowed words for 4%, and words with multiple valid diacritized words for 4%.

Conclusion

The presently disclosed system and method generates a word error rate 63.3% lower than presently available systems for diacritizing written Arabic text. Thus, the presently disclosed system and method provides a solution to the need for a method and system to automatically diacritize a non-diacritized Arabic text, and in doing so, to determine the proper diacritic given the word and the context in which it is used.

Without further elaboration, it is believed that one skilled in the art can use the preceding description to utilize the claimed inventions to their fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles discussed. In other words, various modifications and improvements of the embodiments specifically disclosed in the description above are within the scope of the appended claims. For example, any suitable combination of features of the various embodiments described is contemplated. The scope of the invention is therefore defined by the following claims.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
(A) receiving a source sentence;
(B) converting the source sentence into a word sequence, wherein the word sequence comprises a plurality of words including a target source word;
(C) overlaying a context window at a first position within the word sequence to select a first subset of the word sequence contained within the context window at the first position, wherein the first subset of the word sequence contains the target source word;
(D) generating a first diacritized form of the target source word based on the first subset of the word sequence;
(E) translating the context window to a second position within the word sequence to select a second subset of the word sequence contained within the context window at the second position, wherein the second subset of the word sequence contains the target source word;
(F) generating a second diacritized form of the target source word in the second subset of the word sequence;
(G) repeating steps (E) through (F) to generate a plurality of diacritized forms of the target source word; and
(H) selecting a final diacritized form of the target source word from the plurality of diacritized forms of the target source word according to a voting scheme, wherein the context window is a varying number of words in length and the voting scheme weights each diacritized form of the plurality of diacritized forms based on a given length of the context window used to generate a corresponding diacritized form.

2. The method of claim 1, wherein each of the plurality of words of the word sequence comprises a sequence of characters.

3. The method of claim 2, wherein the sequence of characters comprises a character boundary in between each character within each of the plurality of words and a word boundary between each of the plurality of words in the word sequence.

4. The method of claim 1, wherein the voting scheme further comprises, responsive to identifying more than one diacritized form of the target source word generated the most number of times, selecting the diacritized form of the target source word from the segment of words in which the target source word is the center word of the segment of words.

5. The method of claim 1, wherein the context window is a fixed number of words in length.

6. The method of claim 1, wherein the context window is a fixed number of characters in length.

7. The method of claim 1, wherein generating a diacritized form of a target source word comprises inputting the word sequence into at least one machine learning model.

8. The method of claim 7, wherein each of the plurality of diacritized forms is generated by the same machine learning model.

9. The method of claim 7, wherein the plurality of diacritized forms are generated by more than one machine learning model.

10. The method of claim 7, wherein the at least one machine learning model is a sequence to sequence model.

11. The method of claim 1, wherein translating the context window further comprises incrementing the position of the context window by a set number of words.

12. The method of claim 11, wherein the set number of words is one word.

13. A system comprising:
a processor; and
a memory storing instructions which, when executed by the processor, cause the processor to:
(A) receive a source sentence;
(B) convert the source sentence into a word sequence, wherein the word sequence comprises a plurality of words including a target source word;
(C) overlay a context window at a first position within the word sequence to select a first subset of the word sequence contained within the context window at the first position, wherein the first subset of the word sequence contains the target source word;
(D) generate a first diacritized form of the target source word based on the first subset of the word sequence;
(E) translate the context window to a second position within the word sequence to select a second subset of the word sequence contained within the context window at the second position, wherein the second subset of the word sequence contains the target source word;
(F) generate a second diacritized form of the target source word in the second subset of the word sequence;
(G) repeat steps (E) through (F) to generate a plurality of diacritized forms of the target source word; and
(H) select a final diacritized form of the target source word from the plurality of diacritized forms of the target source word according to a voting scheme, wherein the context window is a varying number of words in length and the voting scheme weights each diacritized form of the plurality of diacritized forms based on a given length of the context window used to generate a corresponding diacritized form.

14. The system of claim 13, wherein each of the plurality of words of the word sequence comprises a sequence of characters.

15. The system of claim 13, wherein the context window is a varying number of words in length and the voting scheme comprises selecting the diacritized form of the target source word based on weighting factors assigned to each respective context window of a given length.

16. A non-transitory, computer-readable medium storing instructions which, when performed by a processor, cause the processor to:
(A) receive a source sentence;
(B) convert the source sentence into a word sequence, wherein the word sequence comprises a plurality of words including a target source word;
(C) overlay a context window at a first position within the word sequence to select a first subset of the word sequence contained within the context window at the first position, wherein the first subset of the word sequence contains the target source word;

(D) generate a first diacritized form of the target source word based on the first subset of the word sequence;

(E) translate the context window to a second position within the word sequence to select a second subset of the word sequence contained within the context window at the second position, wherein the second subset of the word sequence contains the target source word;

(F) generate a second diacritized form of the target source word in the second subset of the word sequence;

(G) repeat steps (E) through (F) to generate a plurality of diacritized forms of the target source word; and (H) select a final diacritized form of the target source word from the plurality of diacritized forms of the target source word according to a voting scheme, wherein the context window is a varying number of words in length and the voting scheme weights each diacritized form of the plurality of diacritized forms based on a given length of the context window used to generate a corresponding diacritized form.

\* \* \* \* \*